United States Patent [19]
Johnson

[11] 4,123,246
[45] Oct. 31, 1978

[54] SHAPING AND QUENCHING GLASS SHEETS BY ROLL FORMING USING TRANSITION QUENCH ROLLS

[75] Inventor: Randall S. Johnson, Bellwood, Pa.
[73] Assignee: PPG Industries, Inc., Pittsburgh, Pa.
[21] Appl. No.: 872,409
[22] Filed: Jan. 26, 1978
[51] Int. Cl.² .......................................... C03B 23/02
[52] U.S. Cl. ....................................... 65/104; 65/107; 65/268; 65/273; 65/285
[58] Field of Search ................. 65/104, 114, 268, 273, 65/107, 285

[56] References Cited
U.S. PATENT DOCUMENTS

| | | | |
|---|---|---|---|
| 2,348,887 | 5/1944 | Drake | 65/273 X |
| 3,409,422 | 11/1968 | Gulotta | 65/287 X |
| 3,701,644 | 10/1972 | Frank | 65/106 |
| 3,856,499 | 12/1974 | Frank | 65/104 |
| 3,869,269 | 3/1975 | Knapp | 65/106 |
| 3,871,855 | 3/1975 | Frank | 65/273 X |
| 3,891,420 | 6/1975 | Frank | 65/106 |
| 3,929,441 | 12/1975 | Frank | 65/106 |
| 3,934,996 | 1/1976 | Frank | 65/106 |
| 3,992,181 | 11/1976 | Frank | 65/104 |
| 4,043,783 | 8/1977 | Frank | 65/106 |

*Primary Examiner*—Arthur D. Kellogg
*Attorney, Agent, or Firm*—Dennis G. Millman; Edward I. Mates

[57] ABSTRACT

This invention relates to shaping and quenching glass sheets by roll forming to either simple or compound curvatures comprising a longitudinal component of curvature about an axis of bending transverse to a path of movement by a controlled, repeatable program of roll forming without causing the glass sheets to stop their forward movement during their shaping. A series of glass sheets are heated and then rapidly cooled while conveyed along a path defined by a conveyor system comprising longitudinally spaced rotating rolls. The path includes a longitudinally curved portion that imparts a longitudinal component of curvature to the glass sheets after the latter are softened by heat.

In this invention, shaped solid members such as successive rotating shaping rolls of predetermined contour of a uniform cylindrical or curved configuration engage a heat-softened glass sheet along an arcuate longitudinal path of substantially constant radius of curvature along forming and quenching conveyors of said conveyor system to impart the desired longitudinal component of curvature to the glass and to convey the shaped glass past cool blasts that harden the glass surfaces. The arcuate path is arranged in such a manner that its upward slope at its downstream end is limited to one at which glass sheets move forward toward the cooling conveyor without slipping. A set of at least three special quench rolls forms an upwardly sloped transition conveyor section of constant maximum slope that replaces the downstream portion of the arcuate path where the upward slope would increase to a slope where slippage would take place. The special transition quench rolls are located downstream of the location where blasts of tempering fluid applied at the quenching section have hardened the major glass sheet surfaces sufficiently to avoid their distortion by engagement with the rotating, special transition quench rolls.

10 Claims, 1 Drawing Figure

SHAPING AND QUENCHING GLASS SHEETS BY ROLL FORMING USING TRANSITION QUENCH ROLLS

RELATION TO OTHER APPLICATIONS

This invention is related to the inventive subject matter described and claimed in U.S. patent application Ser. No. 847,876 of Randall S. Johnson and Terry L. Wolfe for Method and Apparatus for Shaping Glass Sheets by Roll Forming, filed Nov. 2, 1977, although it may also be used to improve the operation of any roll forming apparatus that includes forming rolls of any configuration including a cylindrical configuration located along an arcuate path of longitudinal curvature to be imparted to moving glass sheets.

BACKGROUND OF THE INVENTION

1. Field of the Invention

The present invention relates generally to the production of shaped, tempered sheets of glass and, more particularly, to an improved method of and apparatus for shaping and heat treating relatively thin glass sheets to shapes having a longitudinal component of curvature about an axis extending transversely of the path traversed by the shaped glass sheet during its shaping.

Shaped glass sheets are widely used as side windows in vehicles, such as automobiles or the like and, to be suitable for such application, flat glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped windows to damage resulting from impact.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. To promote efficient and large scale production, discrete glass sheets are conventionally heated, bent and cooled while being moved continuously along a fixed path and successively through a heating section, a roll forming section, a quenching section and a cooling section. To achieve satisfactory temper, the temperature of the glass sheet must be above a predetermined minimum level so as to maintain the core or interior thereof above a deformation temperature upon being exposed initially to the quenching medium at the quenching section. The residual heat remaining in glass sheets of previous commercial thicknesses, such as those having nominal thicknesses ranging from 4.5 millimeters to 6 millimeters, is generally sufficient after shaping for immediate advancement to the tempering area and exposure to the quenching medium. Thus, the heat initially imparted to a relatively thick glass sheet to bring it to proper temperature for shaping can also be utilized in the final heat treating operation.

However, within the last several years, considerable emphasis has been placed on the use of thinner and thinner glass sheets for automobile side windows as a means of reducing overall weight of the autos as a means to obtain better fuel mileage. This has posed problems in shaping and tempering, due to the lesser ability of the thinner sheets to retain heat and the aforementioned conventional process of bending and treating glass sheets does not lend itself to the processing of these relatively thin sheets, such as those having nominal thicknesses ranging from less than 3 millimeters to 4 millimeters (90 mils to 160 mils). As the thickness of the glass decreases, the rate of heat loss increases and the heat initially imparted to such thin sheets is quickly dissipated upon leaving the heating atmosphere of the furnace and during the relatively cool bending cycle. Attempts to solve these problems by initially overheating the thin glass sheets have not been successful because of the consequent loss of control of the glass shaping process and the degradation of the surface quality of the finished glass as a result of heat stains, roll ripple distortion, and the imposition of roll marks in the surface of the heat-softened glass sheet.

Consequently, roll forming has been developed as a technique for shaping and tempering glass sheets at a high production rate. One of the benefits of the roll forming process is the rapid removal of each individual glass sheet from the heating section or furnace through the shaping section and into the quenching section. In the roll forming method, glass sheets are conveyed without stopping through heating, shaping, and tempering sections along high speed glass sheet conveyor means to drastically reduce the time needed to traverse the distance between the exit of the heating section or furnace to the tempering or quenching section to a minimum, preferably under 5 seconds. Under such circumstances, thin glass sheets can be tempered by quenching without imparting such a high initial temperature at the furnace that shape control and control of surface quality is lost as a consequence of insuring that the temperature at the core of each glass sheet does not cool to below the minumum temperature needed on arrival at the quenching section to assure adequate temper.

Quenching or tempering medium is applied against the opposite major surfaces of the shaped glass sheets at the quenching section. Beyond the quenching section, tempered glass sheets are cooled to handling temperature as they traverse a cooling section where they are further cooled.

In order to be practical for commercial purposes, the roll forming section of roll forming apparatus includes a series of forming rolls whose vertical positions can be adjusted so as to provide a series of forming rolls disposed in longitudinally spaced relation along an arcuate longitudinal path of approximately constant radius of curvature, which radius of curvature can be adjusted to handle sheets of different longitudinal shapes. The distance between the end of the furnace conveyor section and the beginning of fixed, horizontally aligned conveyor rolls in the cooling section of the apparatus where the glass sheets have surfaces sufficiently hard to withstand surface damage on contact with misaligned rolls is fixed. Consequently, in making symmetrical longitudinal bends of a predetermined radius of curvature, the glass sheets have to traverse an arcuate path comprising a portion of the circumference of a circle before they reach the fixed, horizontally aligned conveyor rolls. This arcuate path comprises a downstream portion having an upward slope symmetrical with a downward slope at the upstream end of the arcuate path for said predetermined radius of curvature.

Typical roll forming apparatus for shaping glass sheets to a curved configuration comprising a longitudinal curvature component about an axis of bending that extends transversely of the path of glass sheet movement comprises a roll conveyor system comprising a furnace conveyor extending through a furnace along a horizontal path at one level, a cooling conveyor extending through a cooling section (from a conveyor section beginning at a location where the glass surfaces are hardened) along a horizontal path at said level and a forming conveyor and a quenching conveyor defining an arcuate longitudinal path of substantially constant radius of curvature of concave elevation interconnecting the furnace conveyor with the cooling conveyor. The upstream portion of the forming conveyor is sloped downward and the downstream portion of the quenching conveyor is sloped upward. Frequently, slippage occurs in the upward sloped portion of the quenching conveyor, particularly when shaping glass sheets to a longitudinal component of curvature that has a sufficiently short radius of curvature that the upward slope of the arc of the curve at the downstream portion thereof is so steep that the shaped glass cannot be propelled upward by friction of the rotating rolls in the downstream portion of the quenching conveyor.

The problems associated with shaping thin glass sheets to shapes incorporating a longitudinal curvature component about an axis transverse to the path of glass sheet movement will be understood better in the light of a description of the prior art that follows.

2. Description of the Prior Art

Many patents have been issued on roll forming.

Drake U.S. Pat. No. 2,348,887 moves heated glass sheets between a pair of aligned pressure rolls 32 and 33 of cylindrical configuration which force the bottom surfaces of the glass sheets to ride over a series of spaced bending rolls 31 of cylindrical configuration mounted for rotation along spaced lines that extend transversely of a longitudinally curved path corresponding to the shape desired for the bent glass sheets. The shapes imparted to the moving glass sheets are limited to cylindrical curvatures of uniform rather large radius about an axis transverse to the path of glass movement. Once the trailing end of a glass sheet passes beyond the pressure rolls, it becomes difficult to prevent slippage between the sheet and the rotating rolls.

Frank U.S. Pat. Nos. 3,701,644; 3,856,499; 3,871,855; 3,891,420; 3,929,441; 3,934,996; 3,992,181 and 4,043,783, and Knapp U.S. Pat. No. 3,896,269 disclose roll forming apparatus capable of shaping a succession of discrete moving glass sheets to either simple shapes provided with one component of shape about either an axis extending longitudinally of the path of glass sheet movement or about an axis extending transversely thereof or compound shapes involving various combinations of the first two components conforming to said simple shapes. The roll forming apparatus of this group of patents uses sets of forming rolls that move transverse to the path of glass sheets therebetween during shaping.

SUMMARY OF THE INVENTION

The present invention provides a method and apparatus for shaping glass sheets to curved configurations comprising a longitudinal component of curvature by a roll forming method wherein a series of discrete glass sheets move along the space between a furnace conveyor and a cooling conveyor through a roll forming and quenching section of novel construction at a high speed without stopping, thereby producing shaped glass sheets at a high rate of production according to a controlled, predetermined, repeatable program of roll forming. The roll forming conveyor of the present invention comprises a series of rotating rolls that are adjustably fixed in vertical position relative to one another along a generally arcuate longitudinal path of concave elevation of substantially constant radius of curvature so as to minimize the number of moving parts. The rolls are vertically adjustable in position relative to one another in such a manner as to provide controlled support for the main body of each glass sheet as a longitudinal component of curvature of substantially constant radius of curvature is imparted to the moving glass sheets.

In imparting a longitudinal component of curvature to glass sheets, the arcuate path occupied by the rolls of the forming conveyor is continued by having the conveyor rolls in the upstream portion of the quenching section occupy additional positions along the arcuate path. The upstream rolls of the forming conveyor are spaced along a portion of the arcuate path having a downward slope and rolls in the downstream portion of the quenching section are spaced along a portion of the arcuate path that has an increasing upward slope. In order to obtain proper uniformity of longitudinal curvature in the glass sheets, it is important to locate each of the forming rolls along said arcuate path and to continue the spaced supports along a continuation of said arcuate path in the upstream portion of the quenching section until the glass surfaces are sufficiently hardened to resist observable damage resulting from engagement with one or more rolls that are misaligned with the arcuate path defined by the other forming rolls.

In apparatus for which the present invention is especially adapted, the rolls in the furnace conveyor section are in horizontal alignment with the rolls of the cooling conveyor section. An intermediate arcuate conveyor section spans a fixed distance therebetween through the forming section and the quenching section. With shorter radii of curvature, a steep upward slope would exist at the downstream end of the arcuate path. This upward slope is sometimes sufficient to cause the moving glass sheets to slip relative to the conveyor rolls. Such slippage damages the glass surface and also interferes with the smooth procession of glass sheets through the apparatus.

The present invention provides an arrangement of special transition quench conveyor rolls at the downstream end of the intermediate conveyor section where the glass sheet surfaces are sufficiently hard to resist observable damage due to engagement with one or more rolls misaligned with the arcuate path. The special transition quench rolls are arranged along a line that deviates from the arcuate path to convey the glass sheets to the level of the upstream end of the cooling conveyor section. In the downstream portion of the intermediate conveyor section, the special transition quench conveyor rolls are arranged along a path whose upward slope does not exceed the maximum slope permitted for the arcuate path of constant radius of curvature. In this manner, slippage between the glass sheets and conveyor rolls is avoided and surface damage and interference with continuous flow of glass sheets is avoided.

In order to insure enough length of conveyor for each longitudinally shaped glass sheet to be exposed to chilling blasts of tempering fluid that harden the glass surfaces before the glass sheets are transferred from forming rolls aligned along the arcuate path of longitudinal curvature to transition rolls out of alignment with said arcuate path, the individual forming rolls supporting the bottom surface of the glass sheets are supported in such a manner that the downward slope at the upstream portion of the arcuate path is sufficient to insure that the arcuate path has at its downstream end a maximum upward slope less than the upward slope at which slippage would take place. Also, the special transition quench rolls in the transition conveyor section aligned along a straight line path of approximately constant upward slope are located in the portion of the quenching section of the apparatus where the glass sheet surfaces are sufficiently hard from cooling in the upstream portion of the quenching section as to be able to avoid observable damage to the glass.

The various elements of the present invention will be understood more clearly in the light of a description of a specific embodiment of this invention which follows.

DESCRIPTION OF THE DRAWING

The drawing, which forms part of the description of a specific embodiment of this invention, and wherein like reference numbers are applied to like structural elements, is a schematic longitudinal assembly view of a specific embodiment of apparatus according to the present invention showing the relative arrangement of forming rolls of a roll forming section of apparatus conforming to the present invention and the relation of the arcuate path occupied by the forming rolls to transition rolls in the intermediate conveyor section bridging the space between the furnace conveyor and the cooling conveyor of said apparatus.

DESCRIPTION OF THE SPECIFIC EMBODIMENT

Figure 1:
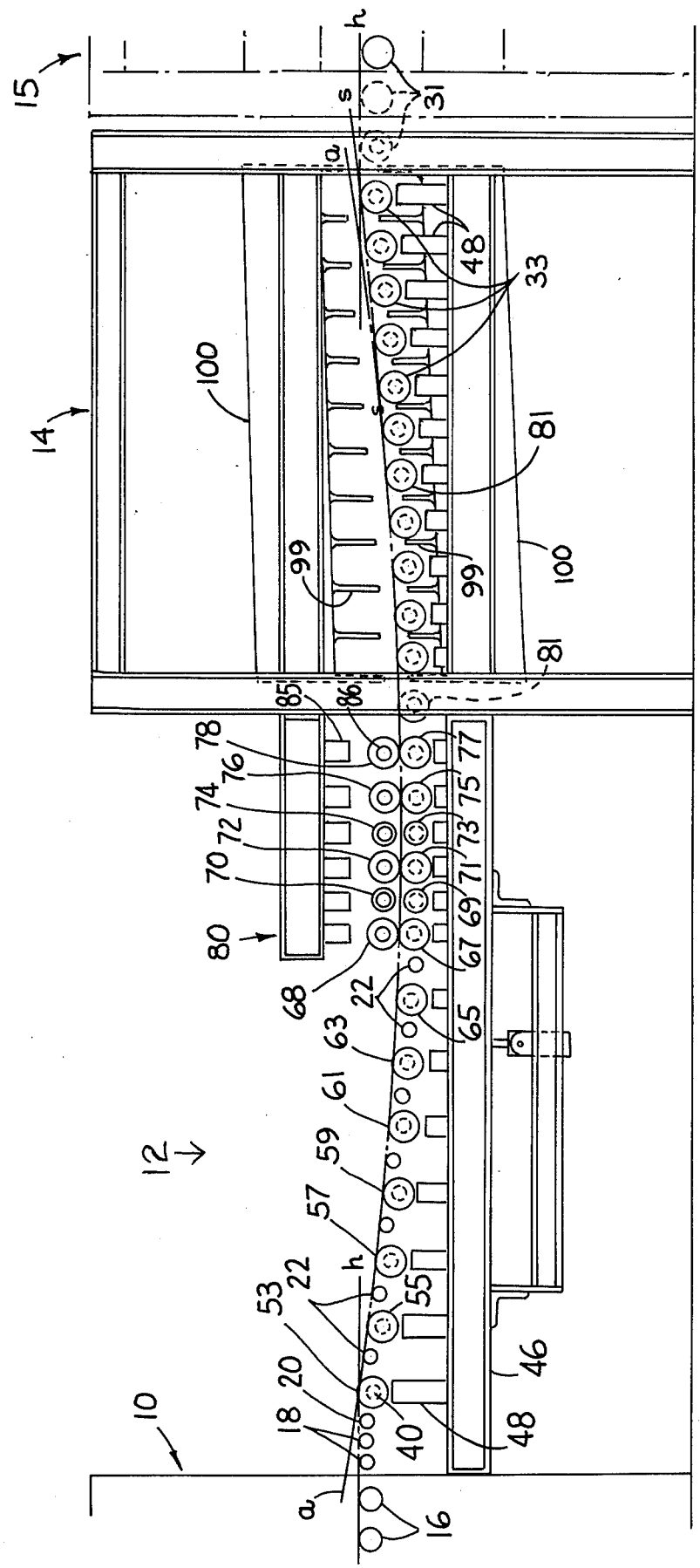

Referring to the drawing, a specific embodiment of this invention incorporates a tunnel-type furnace 10 followed by a roll forming section 12 composed of two portions followed by a quenching section 14 and a cooling section 15 disposed in closely spaced end to end relation to one another. The furnace includes an orienting and alignment means (not shown) adjacent the furnace exit and within the furnace. A typical orienting and alignment means that may be used is found in U.S. Pat. No. 3,701,643 to Frank, the description of which is incorporated herein by reference.

A conveyor system comprises a furnace conveyor extending into the first portion of the roll forming section along a horizontal plane $h$. The furnace conveyor comprises a plurality of furnace conveyor rolls 16, each extending transversely of the furnace in longitudinally spaced relation along the length of the furnace to provide transversely extending, longitudinally spaced rotating lines of support for propelling glass sheets through the furnace and a pair of exit rolls 18.

A pivotable transfer conveyor section comprising a pivot roll 20 and a series of additional conveyor rolls 22 extends obliquely downward in a downstream direction from the end of the furnace conveyor in a preferred embodiment of roll forming apparatus that uses the present invention. However, the present invention may be used in apparatus that does not include a pivotable transfer conveyor section, as will become evident from further study of this disclosure.

Rolls 16, 18 and 20 are mounted in such a manner as to provide longitudinally spaced rotating supports in the horizontal plane $h$ for the bottom surface of flat glass sheets. Rolls 22 are mounted for rotational support on conventional bearing housings (not shown) and supported on a pair of roll interconnected longitudinal side members to enable the additional conveyor rolls 22 to pivot in unison relative to the prior roll 20. The details of the pivotable transfer conveyor section are described in copending U.S. patent application Ser. No. 847,876 of R. S. Johnson and T. L. Wolfe, the description of which is incorporated herein by reference. The rolls 16, 18, 20 and 22 are cylindrical shafts of relatively small diameter and are composed of thin metal shafts (preferably stainless steel) covered with a fiber glass sleeve or tape or with a hard ceramic coating.

The cooling section 15 is provided with a cooling conveyor that carries glass sheets between upper and lower plenums and comprises a series of rolls 31 disposed at longitudinally spaced portions along a continuation of the horizontal path $h$ occupied by and spaced from the rolls 16, 18 and 20 of the furnace conveyor. The conveyor system includes a forming conveyor that extends in an arcuate path $a$ from just downstream of the pivot roll 20 to just upstream of the quenching section 14 and a quenching conveyor that forms a continuation of the arcuate path $a$ and includes a series of at least three special transition quench rolls 33 arranged along a path $s$ of constant upward slope at the downstream end of the quenching section 14. The arcuate path $a$ has a substantially uniform radius of curvature except where it is modified by the special transition quench rolls 33.

When the apparatus is operating to form glass sheets into compound curvatures having both transverse and longitudinal components of curvature, the additional conveyor rolls 22 are arranged in a straight line along a downward oblique path and rotate in unison in an obliquely downward direction from the horizontal path that terminates at the pivot roll 20. Thus, the pivot roll 20 and the additional conveyor rolls 22 are supported to define an obliquely downwardly extending path beyond the exit rolls 18 near the furnace exit. The obliquely downward orientation of the additional conveyor rolls 22 relative to the pivot roll 20 is an important feature in obtaining rapid and controlled curvature of glass sheets from a flat to a curved transverse configuration during their transfer from the furnace 10 to the quenching section 14 when glass sheets are shaped to said compound curvature. When the glass sheets are to be shaped to single curves involving a longitudinal component of curvature only, the additional conveyor rolls are disposed along the arcuate path $a$ and are closely spaced with lower forming rolls of cylindrical configuration to help shape the conveyed glass sheets to their desired simple shape.

The roll forming section 12 comprises a plurality of forming rolls mounted on rotatable shafts 40. Each shaft is driven from a common drive mechanism (not shown) and extends through a pair of lower bearing brackets (not shown) rigidly mounted to a rigid lower support frame 46 having longitudinally extending horizontal support members on which are mounted shims 48 which support the bearing brackets different distances above the support frame 46.

The bearing brackets are arranged in pairs transversely aligned with one another and spaced longitudinally relative to one another to support in rotating relation along an arcuate path *a* different successive lower forming rolls 53, 55, 57, 59, 61, 63, 65, 67, 69, 71, 73, 75, and 77 in the roll forming section 12. Forming rolls 55 to 65 are disposed intermediate and approximately midway between adjacent conveyor rolls 22. Forming rolls 67, 69, 71, 73, 75 and 77 are aligned vertically with upper forming rolls of complementary configuration 68, 70, 72, 74, 76 and 78, respectively. If the lower forming rolls are cylindrical to form a simple bend, so are the upper forming rolls. The shims 48 are arranged in size in such a manner that the forming rolls are located at longitudinally spaced portions along the arcuate longitudinal path *a* of concave elevation. Quench conveyor rolls 81 of similar configuration to the lower forming rolls 53 to 77 are located in the quench section 14 and are arranged in spaced relation along a continuation of the arcuate path *a* of concave elevation defined by lower forming rolls 53 to 77. The arcuate path defined by the forming rolls 53 to 77 and the quench conveyor rolls 81 is of approximately constant radius of curvature from a maximum downward slope between forming rolls 53 and 55 and a maximum upward slope between the last two rolls 81 in excess of which glass slippage would take place.

The present invention provides special transition quench rolls 33 disposed along a straight line *s* having an upward slope approximating the maximum upward slope between the last two rolls 81. The maximum upward slope permitted is one which the glass sheets can climb without slipping. Since the distance between the pivot roll 20 and the first cooling conveyor roll 31 is a constant, it is deemed advisable to adjust the vertical positions of forming rolls 53 and 55 to establish an initial downward slope for the arcuate path that results in a maximum upward slope at the downstream end of the quench conveyor rolls 81 that is less than an upward slope that would cause a glass sheet to slip while ascending the slope on rotating rolls. In the illustrative embodiment, four special transition rolls 33 are spaced along the path *s* of constant upward slope in linear obliquely upward alignment between the last forming roll 81 in the quenching section 14 and the first cooling conveyor roll 31.

For apparatus producing compound curves having both longitudinal and transverse components of curvature, each of the forming rolls 53 through 77 is composed of shaped segments having a transverse curvature of concave elevation transverse to the path defined by the first series of additional conveyor rolls 22. Each segment is composed of a material having a low thermal conductivity, a low coefficient of thermal expansion over a wide range of temperatures and a chemical composition that does not react chemically with glass. In addition, the material selected for the segments is durable over said wide temperature range and one that makes the segments readily shaped or machined to curved contours. An asbestos cement of alumino-silica composition sold by Johns Manville under the trademark of TRANSITE has been found to be most suitable for the segmented rolls of roll forming apparatus useful in the present invention. The upper forming rolls 87 through 97 are also preferably composed of the same composition.

Each bearing bracket and its corresponding horizontal support member of the rigid support frame 46 is provided with aligned apertures and is spaced above the respective support member by a distance determined by a shim 48 disposed between each horizontal support member and its corresponding bearing bracket 42 and provided with aligned apertures to receive attachment bolts and nuts. By providing shims 48 of different thickness along the length of the roll forming section 12 and the quenching section 14, the forming rolls 53 to 77 of the roll forming section 12 and the rolls 81 of the quenching section 14 are supported at spaced transverse lines along a smooth arcuate path of substantially constant radius of curvature correlated with the longitudinal component of shape desired for a glass sheet to be shaped.

If it is desired to impart a simple bend to the glass sheets comprising a longitudinal curvature in a direction along the path of glass sheet movement, the forming rolls 53 to 77 and 81 are made of cylindrical configuration and need not be segmented.

The upper forming rolls 68, 70, 72, 74, 76 and 78 are supported from an upper housing 80. The upper housing 80 supports a pair of mounting brackets (omitted for clarity) in spaced relation below its upper longitudinal support members. Upper shims 85 of different thicknesses complementary to the thickness of each of the corresponding shims 48 space the mounting brackets relative to the housing 80. The mounting brackets support shafts 86 of the series of upper forming rolls 68, 70, 72, 74, 76 and 78 in alignment over the shafts 40 of the corresponding forming rolls 67 to 77 in the second portion of the roll forming section. The upper forming rolls 68 to 78 have a convex outer contour that is complementary to the concave outer contour of the corresponding lower forming rolls 67 to 77 which they oppose.

The thicknesses of the shims 85 spacing the upper forming rolls are inversely related to the thickness of the shims 48 supported the brackets 44 so that lower forming rolls 67, 69, 71, 73, 75 and 77, which are directly opposite upper forming rolls 68, 70, 72, 74, 76 and 78, are supported in uniformly spaced relation below the corresponding upper forming rolls at a spacing slightly more than the thickness of glass sheets passing therebetween.

The rolls 81 and the special transition quench rolls 33 at the quenching section 14 are mounted for adjustment of their vertical positions in a manner similar to the forming rolls 53 to 77, whereas the conveyor rolls 31 at the cooling section 15 are mounted in fixed mountings at the same elevation as the furnace conveyor rolls 16. In general, rolls 81 are adjusted to have vertical positions along a continuation of the arcuate path *a* of substantially constant radius of curvature as defined by forming rolls 53 to 77.

Rolls 81 and 33 in the quenching section 14 are interposed both vertically and horizontally between spaced, opposed upper and lower nozzles 99 that discharge blasts of tempering medium supplied under pressure through upper and lower plenum chambers 100 from blowers (not shown) in a manner well known in the art. Rolls 31 in the cooling section 15 are similarly disposed between nozzles and plenum chambers in a manner well known in the art. The description in copending U.S. patent application Ser. No. 847,876 of Johnson and Wolfe, filed Nov. 2, 1977, is incorporated herein by reference for a more thorough description of a glass sheet tempering system useful in conjunction with the present invention.

The number and position of the special transition quench rolls 33 used depends on how rapidly the glass surfaces harden as the glass is conveyed through the quenching section and the radius of longitudinal curvature imparted to the glass sheets. Also, the number of rolls 81 is limited so that the upward slope from roll to roll is not so great as to cause glass sheet slippage. The special transition quench rolls 33 are aligned linearly at a fixed upward slope less than the slope at which slippage occurs. If the arcuate curvature to be imparted to the glass sheets is such that the maximum upward slope is less than that which causes slippage, there is no need to align rolls 33 in a sloped line $s$. These rolls may either be aligned with the cooling conveyor rolls 31 if the arcuate longitudinal path reaches the level of the cooling conveyor before the end of the quench section 14 or as many of the upstream cooler conveyor rolls 31 as is necessary may be adjusted in their vertical positions to occupy positions along an arcuate path $a$ when the latter has a relatively long radius of curvature.

The driving mechanism for rotating the forming rolls is essentially that provided in the roll forming apparatus of U.S. Pat. No. 3,891,420 to Frank, the description of which is incorporated herein by reference. Independent drives are provided for rotating the additional conveyor rolls 22 of the first series of rolls independently of the drives for the forming rolls 53 to 65, for the lower forming rolls 67 to 77 and for the upper forming rolls 68 to 78. Similar drives are provided for rolls 31 and 33, and 81. The rolls are rotated on straight shafts at speeds designed to convey each glass sheet by friction through the roll forming section 12 as promptly as possible.

The uniformity of shaping each sheet treated will be understood from the repetitive program of operation that each glass sheet experiences. In particular, for producing compound shapes that include a transverse component of curvature, the arrangement of the respective forming rolls 53 through 63 intermediate adjacent additional conveyor rolls 22 gradually transfers each glass sheet from support on rolls 22 to forming rolls 53 through 65. The forming rolls 53 through 65 form an arcuate longitudinal path of substantially constant radius of curvature which continues without change of radius on forming rolls 67 to 77 and then on quench conveyor rolls 81 in the upstream portion of the quenching section. The tempering medium applied to the opposite major glass sheet surfaces hardens the glass surfaces before the sheet reaches the first special transition quench roll 33. The shaped glass then continues its passage through the quenching section on the transition conveyor rolls 33 along line $s$ at a constant upward slope less than one that would cause glass sheet slippage, and then to the horizontally aligned rolls 31, which are located through the length of the cooling section. Since each sheet in turn gets the same treatment, the resulting sheets are shaped uniformly from sheet to sheet.

It is understood that the number of shaped rolls in the first portion of the roll forming section illustrated is exemplary, and the number may be increased or decreased depending on many factors such as size and thickness of glass sheets processed, complexity of bend, etc. Also, the downward slope of the common upper tangent of additional conveyor rolls 22 may be adjusted in view of these factors.

One purpose of providing upper and lower shaping rolls of complementary curvature in the second portion of the roll forming section is to maintain the shape of the glass that is imparted by successive momentary supports by the forming rolls in the first half of the forming section 12 within tolerance limits. It has been found that it is unnecessary to provide all the segments of each forming roll and it has also been found to be desirable to maintain the forming rolls of the second portion of the forming section in a closer longitudinally spaced relation to one another than is possible if all the opposing upper and lower forming rolls had all their segments. Therefore, alternate forming rolls in the second portion of the forming section 12, such as rolls 69 and 89, are provided with only certain smaller diameter segments so as to permit the glass shape imparted by forming rolls 53 to 65 to be maintained within desired tolerance. For example, the upper forming rolls 89 and 93 are provided without centrally disposed larger diameter segments and the transverse outer segments of the lower forming rolls 69 and 83 are omitted.

The opposing forming rolls 67 and 87 are of complementary curvature and are disposed at a distance relative to one another slightly more than the thickness of glass sheets undergoing processing. This is to limit any distortion in shape of the shaped glass sheet as it passes through the second portion of the forming station 12. The same is true of the spacing between forming rolls 69 and 89, between forming rolls 71 and 91, between forming rolls 73 and 93, between forming rolls 75 and 95, and between forming rolls 77 and 97. Also, the downstream pair of forming rolls 77 and 97 effectively reduce the back flow of quenching medium for the quenching section by virtue of their close vertical spacing.

The forming rolls in the first portion of the forming section 12 are mounted on shafts 7 inches (18 centimeters) apart. Removing the largest diameter segments from alternate forming rolls in the second portion permits their arrangement on shafts only 6 inches (15 centimeters) apart or less. The closer spacing helps maintain the longitudinal shape component imparted to glass sheets conveyed over rotating forming rolls arranged along the arcuate longitudinal path $a$ of approximately constant radius of curvature.

Apparatus used to test this invention had individual round nozzles 99 arranged in 48 transversely extending rows longitudinally spaced 4 inches (10 centimeters) apart in the quenching section 14. The nozzles in each row of the first six rows are approximately 0.622 inches (1.6 centimeters) in diameter and the nozzles 99 in the remaining 42 rows are one-half inch (1.3 centimeters) in diameter. The nozzles in each row are spaced approximately 1.5 inches (3.8 centimeters) center to center along the length of each row extending transverse to the glass sheet path. The rows extend transverse to the path of glass movement through the quenching section and adjacent rows of round nozzles are disposed in offset relation to the rows of the immediately preceding and the immediately succeeding row of nozzles. Upper and bottom rows face one another in nozzle to nozzle alignment.

Adequate temper has been obtained from plenum pressures of 12 ounces per square inch (5000 pascals) for the upper plenums and 8 ounces per square inch (3300 pascals) for the lower plenums in processing glass sheets 5/32 inch (4 millimeters) thick. A slight net downward pressure is helpful in keeping thin glass sheets in frictional relation to the shaped rotating rolls in the quenching section so as to move the glass sheets uniformly through the quenching section 14 and avoid "chattering" of the glass sheets as they are conveyed along the conveyor.

At the cooling section 15, additional plenum chambers are provided, each terminating in slot-type nozzles (not shown), having apertured open ends facing the path taken by the glass sheets and transversely shaped to conform generally to the shape defined by the ends of the transverse rows of nozzles which approximates the shape desired for the glass sheet. In the illustrative embodiment, transversely extending slots 3/16 inch (4.7 millimeters) wide are longitudinally spaced 8 inches (20 centimeters) apart. Such arrangements are well known generally in the glass tempering art and specific illustrative operating conditions are disclosed to provide a full disclosure of the present invention.

It will be seen from the foregoing description that a series of glass sheets, after being conveyed through a furnace, is delivered at a deformation temperature to a roll forming section where glass sheet increments are alternately supported momentarily on curved forming rolls and flat additional conveyor rolls so as to gradually impart a transverse curvature thereto. In addition, the shims supporting the bearing brackets on which the forming roll shafts are mounted are of different thicknesses, and the adjustment means for the quenching rolls 81 are properly adjusted, then the succession of forming rolls and quench conveyor rolls in the upstream portion of the quenching section are disposed along the smoothly curved arcuate path $a$. The forming rolls 53 to 77 of the roll forming section impress a longitudinal component of curvature on the glass sheets moving from roll to roll. As the glass sheets pass through the portion of the roll forming section containing lower forming rolls 67 to 77 and upper forming rolls 68 to 78, the longitudinal shape impressed by the forming rolls in the first portion is maintained and the control of the longitudinal component of curvature continues while the glass sheets are then subjected to immediate quenching while supported on shaped quench conveyor rolls 81 along a continuation of the smoothly curved arcuate line $a$ of longitudinal curvature between blasts of air disposed against the upper and lower surfaces of the shaped glass sheets. During initial exposure to quench air at the quenching section 14, the glass sheets are first supported on shaped rotating quench conveyor rolls 81 that extend in a further extension of said curved arcuate path $a$, and then supported on an oblique upward path on special transition quench rolls 33 along a straight line path $s$ at an upward slope less than a slope that would cause slippage, then to cooling conveyor rolls 31 in a horizontal line $h$ parallel to the horizontal line of the conveyor rolls 16 in the furnace. The glass sheets reach the last quench conveyor roll 81 at a location where the glass surfaces have hardened sufficiently to permit their engagement with special transition quench rolls 33 that are out of alignment with the arcuate longitudinal path $a$ of movement without marking the glass surface and allows further tilting to the horizontal plane of support $h$ occupied by additional conveyor rolls 31 in the cooling section 15 without significant distortion.

Flat glass sheets have been shaped and tempered at a rate of over 800 sheets per hour using this apparatus. This has been accomplished without requiring any movement of the forming rolls except for rotation. Glass sheets are conveyed at about 700 inches per minute (18 meters per minute) through the furnace and 1400 inches per minute (36 meters per minute) through the forming section and the quenching section. Glass sheets are heated to attain a temperature in the range of approximately 1150° F. to 1220° F. (620° C. to 660° C.) at the furnace exit and are cooled naturally for about 4 seconds while traversing the forming section which occupies the space between the furance exit and the first row of nozzles in the quenching section.

In a typical production operation using the equipment described to produce over 800 pieces per hour, air is supplied at a nominal flow of about 1000 standard cubic feet per minute per square foot (5 cubic meters per second per square meter) of plenum at a total pressure of 20 ounces per square inch (8600 pascals) to the upper surface and 18 ounces per square inch (7700 pascals) to the lower surface through the first six rows of round nozzles, then at a nominal flow of about 500 standard cubic feet per minute per square foot (2.5 cubic meters per second per square meter) of plenum at a pressure of 21 ounces per square inch (9000 pascals) against the upper surface and 18 ounces per square inch of plenum (7700 pascals) against the lower surface through the next 18 rows. The temper is well established at this point.

Additional air blasts are applied at a nominal flow of about 400 standard cubic feet per minute per square foot (2 cubic meters per second per square meter) of plenum at a pressure of 20 ounces per square inch (8600 pascals) against the upper surface and a pressure of 18 ounces per square inch (7700 pascals) against the lower surface through the 24 additional rows of round nozzles. An additional flow at the nominal rate of 200 standard cubic feet per minute per square foot (1 cubic meter per second per square meter) of plenum is then applied through slot nozzles at a pressure of 8 to 10 ounces per square inch (3400 to 4300 pascals) against the opposite surfaces to continue cooling the glass sheets in the cooling section 15.

Glass sheets having a nominal thickness of 5/32 inch (4 millimeters) so treated met all the requirements for a break pattern needed to meet the automotive code. For example, the largest fragment of fractured tempered glass cannot weigh more than 4.25 grams of it fails to meet the code. Typical break patterns show 2 grams to 2.5 grams weight for the largest particle.

A typical production operation uses the equipment described previously to shape glass sheets by roll forming using forming rolls having a transverse radius of curvature of 75 inches (1.9 meters) and with their shafts arranged along a longitudinally curved path having a radius of 3600 inches (93 meters) (including quench conveyor rolls 81 at the upstream portion of the quenching section) in a smooth continuous curved arcuate path $a$ followed by four special transition quench rolls 33 at an upward constant slope of 1.2 percent and additional rolls 31 aligned horizontally in the cooling section 15.

The previously described embodiment relates to method and apparatus for shaping glass sheets from a flat to various curved configurations that incorporate two components of curvature that are concave in elevation. It is also within the gist of the present invention to change the shape of glass sheets from a flat to a curved configuration that includes only a longitudinal component of curvature that is concave in elevation. In such a case, all the forming rolls are of cylindrical configuration as are the quench conveyor rolls and the shafts on which the forming rolls are rotatably mounted. In all instances, the forming rolls and the quenching rolls are rigidly supported along a curved arcuate line *a* followed by a straight line *s* of approximately uniform slope occupied by three or more special transition quench rolls for producing these alternate shapes.

The form of the invention shown and described in this disclosure represents an illustrative preferred embodiment and certain modifications thereof. It is understood that other changes can be made without departing from the gist of the invention as defined by the claimed subject matter which follows. For example, the special transition quench rolls need not necessarily be located along a line of constant upward slope, but may be located along a curved line as long as the line has a lesser upward slope throughout than an upward slope that would result in slippage.

I claim:

1. In apparatus for shaping and tempering glass sheets comprising a furnace, a cooling section spaced from said furnace and a forming section and a quenching section interposed between said furnace and said cooling section, a series of rotating forming rolls longitudinally spaced from one another along a generally arcuate path of approximately constant longitudinal curvature through said forming section and within at least a major portion of said quenching section, wherein the rotating rolls of said series within said quenching section closer to said cooling section are disposed in an upwardly sloped portion of said arcuate path whose upward slope increases to a slope at which a glass sheet would slip when engaged by adjacent rotating rolls disposed along said path, the improvement comprising means supporting said adjacent rotating rolls in said quenching section disposed in said upwardly sloped portion in such relative vertical positions of misalignment with said arcuate path that the maximum upward slope from roll to roll is less than an upward slope at which the glass sheets would slide relative to said adjacent rotating rolls.

2. In apparatus as in claim 1, wherein said rotating forming rolls have a transverse curvature.

3. In apparatus as in claim 2, wherein said rotating forming rolls have a transverse curvature of concave elevation.

4. In apparatus as in claim 1, wherein said rotating forming rolls are of cylindrical configuration.

5. In apparatus as in claim 1, wherein said furnace has a series of rotating furnace rolls whose upper reaches are disposed at a given elevation in a horizontal plane and said cooling section has a series of rotating cooling section rolls whose upper reaches are disposed at said given elevation in said horizontal plane beginning at a location downstream from the entrance to said quenching section, said series of rotating forming rolls extending from downstream of the downstream end of said furnace to within the entrance end of said quenching section along said arcuate path of substantially constant curvature and at least three consecutive downstream rolls along the downstream end of said quenching section are linearly aligned at a constant upward slope less than a slope that would cause glass sheet slippage.

6. In apparatus as in claim 5, wherein the first of said rolls in said quenching section disposed at said constant upward slope with respect to its adjacent rolls immediately upstream thereof is located sufficiently within said quenching station for a glass sheet to have its surface hardended sufficiently to maintain a curved longitudinal configuration corresponding to the curvature of said generally arcuate path when said glass sheet arrives at said first of said rolls disposed at said constant upward slope.

7. In apparatus as in claim 6, wherein each roll in said series of forming rolls upstream of said first of said rolls disposed at said constant upward slope is disposed relative to its immediately preceding roll along a line of substantially constant longitudinal curvature and the slope between adjacent upstream rolls in said series is either a downward slope, a horizontal slope or an upward slope less than said constant upward slope.

8. In a method of shaping and tempering a series of glass sheets by the roll forming process comprising heating a plurality of glass sheets to a glass deformation temperature and conveying each of said plurality of glass sheets on a series of rotating forming rolls disposed along an arcuate path of substantially constant radius of curvature having a generally descending portion adjacent where the glass sheets are heated to shape said glass sheets to a curvature conforming to said arcuate path, and cooling said shaped glass sheets while conveyed on additional rotating rolls disposed along a continuation of said arcuate path rapidly enough to harden the glass sheet surfaces, the improvement comprising transferring said glass sheets after their surfaces have hardened to rotating rolls disposed along a line having a maximum upward slope from roll to roll less than an upward slope at which the glass sheet would slide relative to said rotating rolls.

9. In a method of shaping and tempering glass sheets by roll forming in which a continuously moving sheet while heated to at least its deformation temperature successively passes over a plurality of rotating forming rolls extending transversely and longitudinally spaced from one another to define a discontinuous arcuate longitudinal path of movement of substantially constant radius of curvature, said path having an upstream path portion of decreasing downward slope and a downstream path portion of increasing upward slope to form a curved shape of substantially constant radius of curvature correlated with said curved path of movement, conveying said sheet on said rotating forming rolls, thus lowering said sheet in the upstream portion of said path along a downwardly curved portion of said path to develop said curved shape and applying cold tempering medium to chill the surfaces of said sheet having said curved shape while continuing to convey said sheet over said rotating rolls, the improvement comprising transferring said sheet after its chilled surfaces have hardened sufficiently to reduce surface damage due to engagement with misaligned rolls from said rotating rolls disposed along said downstream path portion to rotating rolls misaligned with said arcuate path and aligned at an upward slope less than the slope at which the glass sheets would slide relative to said rotating rolls.

10. A method of shaping glass sheets to a compound curvature by roll forming and tempering said shaped sheets comprising conveying a series of glass sheets while at a deformation temperature in an arcuate path comprising a downwardly sloped upstream portion and an upwardly sloped downstream portion over a series of transversely curved rotating forming rolls until each glass sheet in said series sags to a first shape component conforming to the transverse configuration of said transversely curved rolls and to a second shape component conforming to said arcuate path, quenching the opposite surfaces of said shaped glass sheet sufficiently rapidly with tempering medium to harden the surfaces thereof sufficiently to reduce surface damage due to engagement with misaligned rolls while continuing to convey said glass sheet on curved forming rolls disposed along a continuation of said arcuate path, and transferring said shaped glass sheet with its hardened surfaces to additional rotating rolls shaped to said configuration and misaligned with said arcuate path and disposed along a path having an upward slope less than the upward slope at which the glass sheet would slip relative to said rotating rolls if it continued along said arcuate path.

* * * * *